Figures 1, 2:
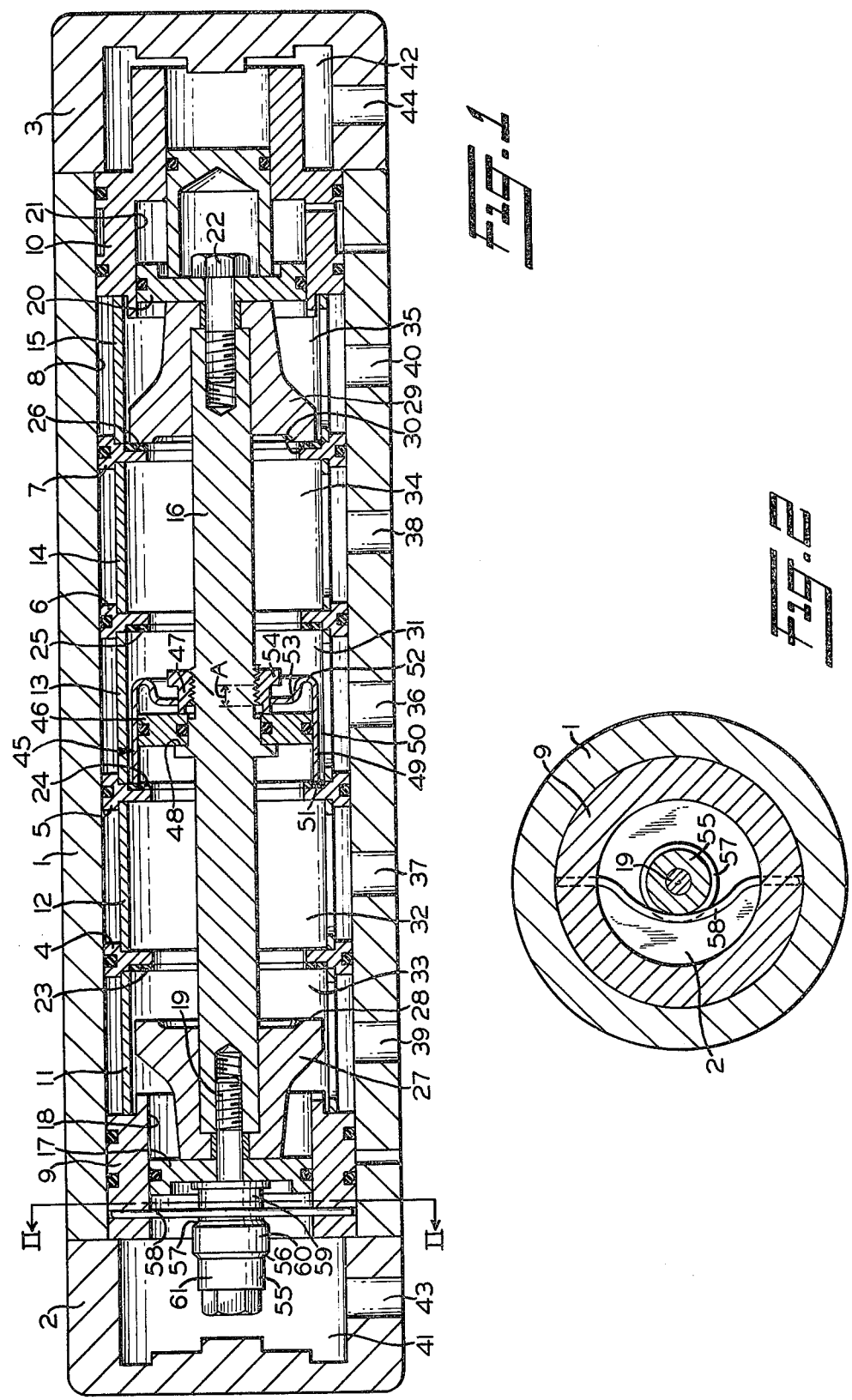

United States Patent [19]
Wenrich

[11] 3,927,692
[45] Dec. 23, 1975

[54] FOUR-WAY POPPET VALVE DEVICE

[75] Inventor: Tom C. Wenrich, Lexington, Ky.

[73] Assignee: American Standard, Inc., New York, N.Y.

[22] Filed: June 28, 1974

[21] Appl. No.: 484,156

[52] U.S. Cl............................. 137/625.27; 251/77
[51] Int. Cl.² ........................................ F16K 11/02
[58] Field of Search................. 137/625.27, 625, 66; 251/77, 297

[56] References Cited
UNITED STATES PATENTS

| | | | |
|---|---|---|---|
| 2,704,649 | 3/1955 | Ellenberger | 251/77 X |
| 3,608,587 | 9/1971 | Zbell | 251/77 X |

FOREIGN PATENTS OR APPLICATIONS

| | | | |
|---|---|---|---|
| 2,124,485 | 5/1971 | Germany | 251/77 |

Primary Examiner—Martin P. Schwadron
Assistant Examiner—Robert J. Miller
Attorney, Agent, or Firm—R. W. McIntire, Jr.

[57] ABSTRACT

A poppet type four-way valve device including lost motion means allowing axial self-adjustment of the valve stem to compensate for wear and excessive manufacturing tolerances and thereby assure positive seating and sealing of the valve member on the respective valve seats, and retention means for retaining the valve in the selected position notwithstanding the removal of the operating force and presence of extraneous forces such as vibrations and shock.

6 Claims, 2 Drawing Figures

FOUR-WAY POPPET VALVE DEVICE

BACKGROUND OF THE INVENTION

Poppet type valves are normally constructed such that the valve stem is a rigid member having several annular valve members axially spaced thereon in respective fixed axial positions, said valve stem being selectively axially positionable for causing certain of the valve members to be seated on certain valve seats according to the selected position for effecting the desired communications. Since in any selected position to which the valve device is operated, at least two, or more, of the valve members are seated on respective valve seats simultaneously, any slight dimensional error, such as in the axial distance between the seated valve members, caused either by wear or during the manufacturing process, may be critical in causing malfunctioning of the device.

SUMMARY OF THE INVENTION

The object of the present invention, therefore, is to provide a poppet type four-way valve device characterized by means for positionally adjusting automatically, when operated to a selected position, to compensate for wear or excessive manufacturing tolerance to assure positive seating and sealing of the valve members on the valve seats, as intended, and means for retaining the valve device in the selected position notwithstanding removal of the operating force and the presence of extraneous forces such as those due to vibration and shock.

Briefly the invention comprises a poppet type four-way valve device including a valve stem having axially spaced thereon several annular valve members and being operable for selectively causing certain ones of the valve members to be seated or unseated relative to certain ones of several valve seats, said valve device being characterized in that two adjacent valve members of the several valve members form a valve unit carried by the valve stem in such manner as to provide a limited amount of relative lost motion between the valve unit and the valve stem sufficient to permit positional self-adjustment to compensate for wear and excessive manufacturing dimensional tolerances and thereby assure positive seating and sealing of the certain valve members on the certain valve seats according to the selected position. The valve device is also characterized by means for retaining the valve device in the selected position, once operated to such selected position, until such time that it is intentionally operated to a different selected position, notwithstanding that the operating force is removed and that the valve device is subjected to extraneous unintentional forces such as vibrations and shock. In the drawing, FIG. 1 is an axially disposed sectional view of a poppet type four-way valve device enbodying the invention, and FIG. 2 is a sectional view taken along line II—II of FIG. 1 as viewed in the direction indicated by the arrows.

DESCRIPTION AND OPERATION

As shown in the drawing, a four-way poppet valve device embodying the invention comprises a main casing section 1 coaxially fixed between two end caps 2 and 3. Four annular valve seat support members 4, 5, 6, 7 are coaxially disposed in a coaxial bore 8 formed in casing section 1. Annular guide members or bushings 9 and 10, for a purpose to be hereinafter disclosed, are coaxially fixed at each end of bore 8 adjacent end caps 2 and 3, respectively. Annular spacer elements 11, 12, 13, 14, and 15 are coaxially disposed between the several guide members 9 and 10 and valve seat support members 4, 5, 6, and 7 for maintaining the proper axial spacings therebetween.

A valve stem 16, extending coaxially through main casing section 1, carries at one end a piston or annular guide member 17 slidably operable in a bore 18 of fixed bushing 9 and secured to said one end of the valve stem by a bolt 19. The other end of valve stem 16 carries a piston or annular guide member 20 slidably operable in a bore 21 of fixed bushing 10 and secured to said other end of the valve stem by a bolt 22.

The valve seat support members 4, 5, 6, and 7 are provided with respective valve seats 23, 24, 25, and 26. A valve member 27 having an annular seating surface 28 is coaxially secured by bolt 19 to the end of valve stem 16 adjacent end cap 2, while a valve member 29 having an annular seating surface 30 is coaxially secured by bolt 22 to the end of said valve stem adjacent end cap 3.

The several valve seat members 4, 5, 6, and 7, and guide members 9 and 10, 17 and 20 divide main casing section 1 into a supply pressure chamber 31 between valve seat members 5 and 6, a first delivery chamber 32 between valve seat members 4 and 5, a first exhaust chamber 33 between valve seat member 4 and guide members 9 and 17, a second delivery chamber 34 between valve seat members 6 and 7, and a second exhaust chamber 35 between valve seat member 7 and guide members 10 and 20. Supply chamber 31 is open to a fluid pressure supply port 36, which may be supplied with fluid under pressure from a source not shown; first and second delivery chambers 32 and 34 are open to respective delivery ports 37 and 38; and first and second exhaust chambers 33 and 35 are open to respective exhaust ports 39 and 40, all of which ports are formed in main casing section 1. At each end of the valve device are pressure chambers 41 and 42 formed within the respective end caps 2 and 3 and chargeable with operating fluid pressure via pressure ports 43 and 44 formed in said end caps respectively.

According to the invention, a valve unit 45 is operably carried at approximately the axial mid-point of valve stem 16 between valve seat members 5 and 6. Valve unit 45 comprises a disc-like or cylindrical guide member 46 coaxially fixed on valve stem 16 by a nut 47 which secures said guide member against an annular shoulder 48 formed on and surrounding said valve stem. The axial dimension and the diameter of guide member 46 are such as to have a cup-like dual valve member 49 coaxially, sealingly and slidably disposed thereon with an annular radial space 50 provided between the dual valve member and the spacer member 13. Dual valve member 49 is provided at opposite ends thereof with seating surfaces 51 and 52 adapted for seating on valve seats 24 and 25, respectively, depending upon the axial position of valve stem 16.

Although valve unit 45 normally moves with valve stem 16, dual valve member 49 may move axially a certain amount relative to said valve stem. The axial movement of dual valve member 49 relative to valve stem 16, or lost motion, is provided by a lost motion connection between said dual valve member and said valve stem, said lost motion connection comprising a radially inwardly extending flange 53 formed on said dual valve member at the end adjacent seating surface 52, the limits of said axial movement being determined by abutment of said flange against the guide member 46 acting as a shoulder at one end of such limited movement and against an annular lip or shoulder 54 surrounding the outer end of nut 47. This amount of free axial movement or lost motion of dual valve 49 relative to valve stem 16 is indicated as A in FIG. 1 of the drawing.

Also in accordance with the invention, bolt 19 adjacent end cap 2 coaxially supports a generally cylindrical cam member 55, having axially spaced thereon a pair of annular oppositely sloping cam surfaces 56 and 57. A spring clip 58 having its opposite ends slidably disposed in diametrally oppositely formed openings in guide member 9, extends across the inner opening of said guide member, and yieldingly bears against the side of cam member 55 either to one side of cam surface 56 or cam surfae 57, as shown in the drawing, depending upon the axial position of valve stem 16.

In operation, let it be assumed that supply port 36 is connected to a source of fluid under pressure (not shown), that delivery ports 37 and 38 are connected to respective fluid pressure operable devices (not shown), and that supply of fluid pressure to ports 43 and 44 may be effected alternatively and independently of each other, the port not thus supplied being vented to atmosphere via means not shown. Assuming that fluid pressure has been supplied to pressure port 44 and that chamber 42, therefore, is charged with fluid pressure while chamber 41 is vented to atmosphere, the valve device is thus operated to a first position in which valve stem 16, as shown in the drawing, occupies an extreme left-hand position.

In the first position of the valve device, valve 27 is unseated from valve seat 23, dual valve 49 is seated on valve seat 24 and unseated from valve seat 25, and valve 29 is seated on valve seat 26. In presently known devices of the general type herein disclosed, the several valve members, such as valves 27, 49, and 29, may be carried on the valve stem in fixed axial positions relative to each other. Thus, if the axial distance between the valves intended to be seated (such as the axial distance between valve seating surfaces 51 and 30, for example) differs, perhaps due to wear or excessive manufacturing tolerances, from the axial distance between the valve seats on which the valves are supposed to seat (such as valve seats 24 and 26, for example), it is probable that one of the valves will be unable to seat properly on the valve seat, thus permitting air to leak past the unseated valve.

The possible situation, above described, which may permit leakage is prevented by the free moving dual valve member 49 in the device herein disclosed. When valve seating surface 30 is seated on valve seat 26, dual valve member 49, being free to move relative to valve stem 16 by a certain amount indicated A in the drawing, can compensate for any wear or excessive manufacturing tolerances of the several valve elements to assure positive seating of the valve seating surfaces on the respective valve seats. It should be evident that dual valve 49 is just as effective if the position of the valve device is shifted from the first position to a second position by causing valve stem 16 to be shifted from the left-hand position, in which it is shown, to a right-hand position, in which the relative positions of the valve members and the valve seats are reversed. That is, valve 27 is seated on valve seat 23, dual valve 49 is unseated from valve seat 24 and seated on valve seat 25, and valve 29 is unseated from valve seat 26.

After operation of the valve device to a selected position, either the first or second position above described, valve stem 16 will remain in said selected position as long as fluid pressure prevails in supply chamber 31 and notwithstanding that the pressure chamber, either 41 or 42, which was charged to effect such operation of the valve device to the selected position, is relieved of such pressure while the other pressure chamber remains uncharged. Valve stem 16 is retained in the selected position under the conditions immediately above described because of differential pressure areas between dual valve member 49 (equivalent to the area on the right side of guide 46) and, in this instance, valve member 29. For example, in the first position of the valve device, as shown, the pressure prevailing in supply chamber 31, and therefore acting on the right side of guide member 46, also prevails in delivery chamber 34 and therefore acts on the effective pressure area of seated valve member 29. The effective pressure area of dual valve 49, above described, on which pressure in chamber 31 acts, is greater than the effective pressure area of valve member 27 on which the pressure in delivery chamber 34 acts, said latter pressure area being that area within the seated portion of the valve member. If the positions of the valve device were reversed, the same results as immediately above set forth would prevail, because the effective pressure area on the left side of guide member 46 is also greater than the effective pressure area of valve member 27 when seated.

In addition to the means above described, by which valve stem 16 is retained in the selected position under the conditions above set forth, a second means is provided for retaining the valve stem 16 in the selected position, even if the actuating pressure in the pressurized chamber of chambers 41 or 42, is released therefrom. This second means is the spring clip 58, above described, which cooperates with the cam member 55. As the valve stem 16 is shifted from one axial position to another, as for example from the left-hand position, in which it is shown, to the right-hand position, clip 58, which is shown resting against a smaller diameter portion 59, is yieldingly forced to ride up over cam surface 57, across a larger diameter portion 60, and down over cam surface 56 until it comes to rest against a smaller diameter portion 61 of the cam member 55. When clip 58 is positioned against one or the other of smaller diameter portions 59 or 61, the biasing force of the clip itself holding it against said smaller diameter portions is sufficient to prevent forcing of the larger diameter portion 60 past said clip when such forces of vibration or shock may be acting on the valve stem 16. The biasing force of spring clip 58 is calibrated such that it requires at least a certain amount but not necessarily the total force of pressure in either of pressure chambers 41 or 42 to force the larger diameter portion 60 therepast in one direction or the other.

If desired, the valve device may be provided with a fulcrum attached at one end of valve stem 16 for manually operating said valve stem from one position to the other.

Having now described the invention, what I claim as new and desire to secure by Letters Patent is:

1. A poppet valve device comprising:

a. a casing having a plurality of fluid pressure inlet and outlet ports;

b. a plurality of annular valve seats coaxially fixed and axially spaced at certain intervals in said casing;

c. a valve stem coaxially disposed and axially reciprocably operable a predetermined axial distance in said casing between a first position and a second position; and d. a plurality of annular valve members axially spaced apart on said valve stem for movement therewith, said valve members cooperating with said valve seats for controlling establishment and cut-off of communications between certain ones of said inlet and outlet ports in the first position of said valve stem, and between the others of said inlet and outlet ports in the second position of the valve stem, e. a cup-like member having on the annular opposite ends thereof two adjacent ones of said valve members disposed at an axially spaced apart distance less than the axial distance between two adjacent ones of said valve seats to form a dual valve unit one or the other of whose valve members is alternatively seatable on one or the other of said two adjacent valve seats, respectively, depending upon the position of said valve stem; and f. a cylindrical guide member coaxially fixed on the valve stem and on which said dual valve unit is coaxially slidably mounted to form a lost motion connection between the dual valve unit and the valve stem for providing a limited amount of relative axial movement therebetween and consequent axial positional adjustment of one or the other of the valve members of the dual valve unit relative to one or the other of said adjacent valve seats in either of said first or second positions, respectively, of the valve stem to compensate for wear or excessive manufacturing tolerance of any of the valve members.

2. A poppet valve device, as set forth in claim 1, wherein one or the other of the opposite sides of said cylindrical guide member is subjected to fluid pressure admitted through one of the inlet ports, depending upon the position of the valve stem, and the oppositely disposed face of the respective seated valve member is also subjected to said fluid pressure admitted through said one of the inlet ports, said face of the cylindrical guide member comprising a larger effective pressure area than that of the oppositely disposed face of the valve member and the respective pressures acting thereon being directed such that the differential force resulting therefrom acts to maintain the valve stem in the selected position, notwithstanding removal of the operating force.

3. A poppet valve device, as set forth in claim 1, wherein said dual valve unit is provided with a radially inwardly extending flange axially movable with said dual valve unit within the axial distance between a pair of annular shoulders fixed on the valve stem in a fixed axially spaced-apart relationship corresponding to the amount of said limited axial movement.

4. A poppet valve device, as set forth in claim 3, further characterized by piston means carried at opposite ends of said valve stem and a pair of fluid pressure chambers formed within and at opposite ends of said casing adjacent said piston means, respectively, said pressure chambers being selectively chargeable with fluid pressure for acting on said piston means to effect selective operation of said valve stem to one of said first and second positions.

5. A poppet valve device, as set forth in claim 4, further characterized by retention means for releasably retaining said valve stem in the position to which it is selectively operated, notwithstanding release of actuating fluid pressure from the charged pressure chamber, until operated to the other position.

6. A poppet valve device, as set forth in claim 5, wherein said retention means comprises an enlarged cam portion formed at one end of said valve stem and a spring clip secured in said casing and being yieldingly engageable on the valve stem at one side or the other of said cam portion, depending upon which of said first or second positions the valve stem is operated to, for retaining the valve stem in the selected position, said cam portion having annular cam surfaces at opposite ends thereof for assisting movement of the cam portion past said spring clip during movement of the valve stem from one position to the other and reversely.

* * * * *

UNITED STATES PATENT AND TRADEMARK OFFICE
CERTIFICATE OF CORRECTION

PATENT NO. : 3,927,692
DATED : December 23, 1975
INVENTOR(S) : Tom C. Wenrich

It is certified that error appears in the above–identified patent and that said Letters Patent are hereby corrected as shown below:

Item [73] Assignee: change "American Standard, Inc." to --American Standard Inc.--

Signed and Sealed this

Fourth Day of January 1977

[SEAL]

Attest:

RUTH C. MASON
*Attesting Officer*

C. MARSHALL DANN
*Commissioner of Patents and Trademarks*